United States Patent [19]

Paskalov et al.

[11] Patent Number: 5,344,462
[45] Date of Patent: Sep. 6, 1994

[54] GAS PLASMA TREATMENT FOR MODIFICATION OF SURFACE WETTING PROPERTIES

[75] Inventors: Georgy Z. Paskalov; Svetlana A. Krapivina; Alexander K. Filippov, all of St. Petersburg, U.S.S.R.

[73] Assignee: Plasma Plus, Los Angeles, Calif.

[21] Appl. No.: 864,434

[22] Filed: Apr. 6, 1992

[51] Int. Cl.$^5$ .................. D06M 10/06; D06M 11/05; D06M 11/34
[52] U.S. Cl. .................... 8/115.52; 427/569; 427/575; 427/255.1; 427/255.2; 427/255.3
[58] Field of Search ............ 427/569, 575, 255.1, 427/255.2, 255.3; 219/121.36, 121.37, 121.38; 422/21, 22; 8/115.52

[56] References Cited

U.S. PATENT DOCUMENTS

| | | | |
|---|---|---|---|
| 4,338,420 | 7/1982 | Arbit | 525/388 |
| 4,504,349 | 3/1985 | Ueno et al. | 427/569 X |
| 4,740,282 | 4/1988 | Gesser et al. | 427/569 X |

FOREIGN PATENT DOCUMENTS

| | | | |
|---|---|---|---|
| 0133975 | 1/1979 | German Democratic Rep. | 427/569 |
| 57-087431 | 5/1982 | Japan | 427/569 |
| 61-247740 | 11/1986 | Japan . | |
| 1030445 | 7/1983 | U.S.S.R. . | |
| 1517489 | 7/1978 | United Kingdom . | |

*Primary Examiner*—Helen M. S. Sneed
*Assistant Examiner*—Douglas J. McGinty
*Attorney, Agent, or Firm*—Natan Epstein

[57] ABSTRACT

Efficiency of low pressure gas plasma processes is increased by addition of small quantities of water vapor to the primary gas constituting the plasma. Treated fabrics and polymer films show decreased wetting angle and increased capillary absorption, which beneficially affects the material's susceptibility to dyeing and impregnation.

15 Claims, 1 Drawing Sheet

GAS PLASMA TREATMENT FOR MODIFICATION OF SURFACE WETTING PROPERTIES

BACKGROUND OF THE INVENTION

1. Field of the Invention

This invention relates to modification of surface properties, particularly surface wetting properties, of various materials, including polymer films, textile fibers, cellulose. Such treatments are typically carried out in preparation to further processing or treatment of the materials, such as dyeing or impregnation of fibers and fabrics.

It is known that surface properties of materials such as textile fabrics, polymer films, paper, cellulose, etc. can be modified by exposure of the material to either a low temperature, low pressure gas plasma or to a corona discharge. The processes performed at low pressure are more efficient than those performed in the corona discharge. Unlike corona discharge treatment, exposure to low pressure plasma discharge does not significantly raise the temperature of the treated material, thereby preserving the physical condition and properties of the material.

2. State of the Prior Art

Previous methods of improving absorbency of strips made of fibers include treatment in a corona discharge, as exemplified by French patent 2,333,084. A disadvantage of this method is that the corona discharge is substantially less effective than low pressure plasma, and relatively prolonged treatment times are necessary to sufficiently improve the capillary absorption of the fabrics.

In U.S. Pat. No. 4,338,420 improved wetting of low pressure polyethylene films is obtained by treatment in a low temperature plasma of inorganic gas such as $O_2$, Ar, $N_2$, or air. The effect of the plasma on the film is weak, however. After plasma treatment the wetting angle is 43 to 60 degrees for polyethylene and 55 to 65 degrees for polypropylene.

Japanese patent 61-247740 describes polyolefine activation before dyeing by treatment in oxygen plasma activated by radiofrequency power at 10 Mhz, at a pressure of 0.3–0.5 Torr, with a treatment time of 5–30 sec. The effect of the plasma treatment on the subject material is insufficient, however.

USSR patent 1030445 addresses the treatment of textile materials containing polyester fibers, including treatment in a solution containing 5–25 g/l metal hydroxide for 2–5 minutes; followed by treatment in a glow discharge plasma with density 0.014–0.27 A/cm2, pressure=0.02–0.04 Torr, T=60–90 sec to achieve enhanced hydrophilic properties. However, the pretreatment in solution considerably increases total treatment time, and the plasma effect on the treated material is insufficient.

SUMMARY OF THE INVENTION

This invention is an improved method for enhancing the hydrophilic surface properties of materials including polymer films, fabrics of natural and synthetic fibers, flax based fabrics and materials of cellulose fiber including paper by treatment in a low temperature plasma of inorganic gas, the improvement comprising addition of water vapor to the primary inorganic gas at a concentration of between 0.05 and 0.5% and a pressure of 0.01–10 Torr. The primary inorganic gas forming the plasma is selected from, but not limited to, the group comprised of the gases $O_2$, Ar, $N_2$, NO, and air, and mixtures thereof. Treatment time may range from 3 seconds to 600 seconds. It is preferred to generate the plasma by means of an alternating frequency power source between 1 MHz and 40 MHz, at a specific power of the plasma of between 0.003 and 3.0 Wt/cm3.

In the case of previously impregnated fabrics, the novel method includes the step of first treating the fabrics in a plasma produced by igniting a glow discharge in a plasma chamber at a pressure of between 0.05 and 0.1 Torr without supplying gas to said chamber. The low pressure encourages evaporation of impregnating substance from the surface of the subject fabric, which impregnating substance would otherwise contaminate the inorganic gas/water vapor plasma and interfere with the surface activation treatment.

The added water vapor has been found to substantially shorten the treatment time required to obtain the desired modified surface properties of the treated materials. Results include increased receptivity of dyestuffs, increased efficiency of viscose impregnation of the fibers, and reduced wetting angle compared to existing treatment methods. Increased capillary absorption of fabrics and decreased wetting angle of polymer films is obtained with substantially reduced treatment times, a significant factor where commercial application of such treatments in large scale continuous processes is contemplated. Benefits include greatly simplified and shortened conditioning of fabrics for dyeing, and shortened times for impregnation of fabrics with viscose, resins and other substances.

DETAILED DESCRIPTION OF THE PREFERRED EMBODIMENTS

Figure 1:
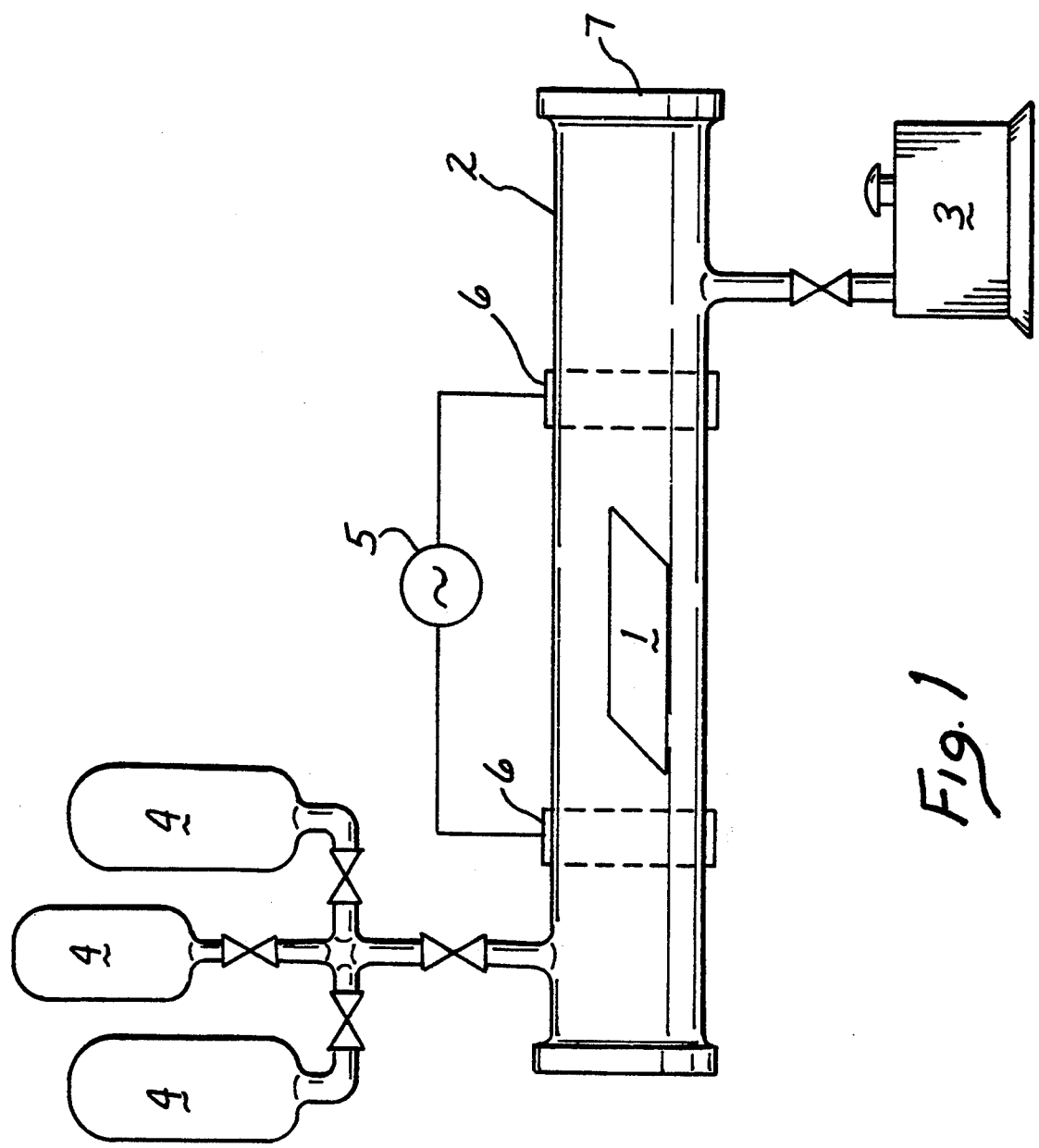
FIG. 1 is a schematic illustration of a low pressure gas plasma chamber used for material treatment according to the improved processes of this invention.

It is known to use low pressure gas plasmas for treatment of materials. A main characteristic of this type of plasma is its non-isotermicity, i.e., Te>>Ti—Tg, where Te—Temperature of electrons
Ti—Temperature of ions
Tg—Temperature of gas
and typically: Te=30,000 degrees K., Tg=375 degrees K.

In the plasma atmosphere, the basic activation effect is caused by free electrons. For instance, the following processes take place in an oxygen plasma:

$$O_2 + e \rightarrow O_2\,(^1\Delta g) + e$$

$$O_2 + e \rightarrow O\,(^3\Sigma u) + e$$

$$O_2\,(^3\Sigma u) + e \rightarrow O\,(^3p) + O\,(^1D) + e$$

$$O\,(^3p) + O_2 + M \rightarrow O_3 + M$$

$$\text{Surface} + (O(^3p),\ O\,(^1\Delta g),\ O_3) \rightarrow \text{surface modification}$$

The components $O_2$, $(^1\Delta g)$, $O(^3p)$, $O_3$ have increased chemical activity at lower temperatures. In this case, chemical interaction with the surface leads to formation of open chemical bonds at the surface. The surface is activated by this treatment, resulting in modification of the surface properties, in particular, its susceptibility to wetting by water and other liquids. In the case of treatment in argon plasma, the surface activation is induced by physical rather than chemical processes, chiefly by the recombination of ionized argon with electrons at the surface, releasing energy which creates open bonds on the surface, activating the same.

Water vapor when added to the inorganic gas generates various processes which operate in different directions. On the one hand, active components are formed which promote the modification of surface properties, i.e. operate to increase hydrophylicity of the surface:

$$H_2O + e \rightarrow H + OH + e$$

$$H + O_2 \rightarrow OH + O\ (^3p)$$

$$O\ (^3p) + \text{surface} \rightarrow \text{modification}$$

On the other hand, the concentration of negative ions of water molecules increases:

$$H_2O + e \rightarrow (H_2O)^-$$

This latter effect leads to a gradual decrease in free electron concentration and to a general reduction of the intensity of the plasma discharge. It has been found therefore, that water vapor concentrations of 0.05 to 0.5% at discharge parameters indicated below yield the best results. Further increase of water vapor concentration lowers the intensity of surface activation and can lead to total extinction of the discharge.

Activation processes in low pressure plasma turn out to be more efficient than those of corona discharge. The temperature the process is very low compared to corona discharge treatment, eliminating the risk of overprocessing or damage to the subject material.

The apparatus employed for the low pressure plasma treatment is schematically illustrated in FIG. 1 of the attached drawing. The plasma treatment is as follows. Material to be processed, indicated by the numeral 1, is placed in a vacuum chamber 2. Three gas bottles 4, separately containing one or more inorganic gases and water vapor, are connected through suitable valves and conduits to the chamber 2. The chamber 2 is evacuated by means of vacuum pump 3 until the interior pressure of chamber 2 reaches approximately 0.01 Torr. The vacuum system then is flushed with oxygen gas from one of bottles 4, and the chamber is again evacuated. Oxygen gas and water vapor are then fed, in metered amounts, into the system to a pressure from 0.01 to 10.00 Torr. Two cylindrical electrodes 6 are mounted to the exterior of the chamber 2 in axially spaced apart relationship. A high frequency electrical power generator 5 connected between the electrodes 6 lights a plasma generating glow discharge in the chamber 2 between the electrodes. The preferred specific power of the discharge is 0.003 to 3 Wt/cm3, and the discharge is sustained for 1 to 300 seconds. Then both the vacuum pump 3 and the generator 5 are turned off. The interior of chamber 2 is brought to atmospheric pressure and the treated material 1 is removed from the chamber by opening end closure 7.

As a result of such treatment, film surfaces exhibit reduced wetting angle, while fabrics better absorb water and other liquids. Hygroscopicity is increased.

The attached Tables 1 through 11, together with examples 1 through 7 given below illustrate the improved method and the results obtained by the same. In all Tables, the analogue is a reference treatment carried out in plasma without water vapor, in accordance with prior practice.

Table 1 shows the wetting angle obtained as a function of water vapor concentration, all other parameters remaining constant, in plasma treatment of a polymer film, specifically low pressure polyethylene. The first line in Table 1 is the initial condition of the sample prior to treatment. Treatment in a plasma of inorganic gases with water vapor added to a concentration of 0.05–0.5% results in reduced wetting angle of the film surface for equal treatment time compared to existing methods. At a $H_2O$ vapor concentration of 0.6% the angle of wetness increases to 44 degrees, which is greater than achieved by the reference treatment. Minimum wetting angle was obtained at $H_2O$ concentrations of approximately 0.10 to 0.15%, while improved results over the reference were obtained for an $H_2O$ concentration range of 0.05 through 0.5.

Table 2 shows treatment time as a function of $H_2O$ concentration to achieve a given wetting angle at constant input power. Table 3 lists input power required as a function of $H_2O$ concentration to achieve a given wetting angle for a fixed treatment time. Both Tables 2 and 3 show that presence of $H_2O$ a concentration of 0.05 to 0.5% decreases processing time as well as the specific power needed to obtain the wetting angle of 43 degrees obtained in the reference treatment.

Table 4 shows data obtained at an optimal concentration of water vapor equal to 0.1%, showing wetting angle Q obtained as a function of input power for treatment without $H_2O$ vapor (column Q, $(H_2O)=0.0$) and treatment with 0.1% $H_2O$ (column $Q(H_2O)$). Table 5 makes a similar comparison for treatments of varying duration at a constant specific power input. Tables 4 and 5 show that for polyethylene film treatment, optimal specific power is 1.5 to 2.0 wt/cm3 and optimal treatment time is 2.5 to 3.5 minutes.

Similar results were obtained for treatment of polypropylene film as shown in Table 6. In each instance the results can be compared to the results obtained in the absence of water vapor the plasma.

Table 7 shows the effect of water vapor added to the plasma on modification of capillary absorption properties of non-impregnated cotton fabric before dyeing. Power input and treatment time are fixed. Water vapor concentration in the plasma was varied and resulting capillary absorption was measured in millimeters of height lifted along a vertical strip of the treated fabric in a 10 minute interval. As one can see from the table, maximum absorption of 54 was obtained at an $H_2O$ concentration of 0.20 to 0.25, compared to absorption of 28 for a reference sample treated without water vapor under otherwise similar conditions.

Table 8 shows how treatment time affects the properties of a non-impregnated fabric sample. The longer the treatment time the greater the capillary absorption of the sample. However, the incremental improvement in absorption diminishes with increasing treatment time, as shown.

Table 9 shows plasma treatment data for impregnated fabrics. Column 3 lists capillary absorption obtained by a 10 minute plasma treatment with water vapor present in the indicated concentration. Column 4 lists capillary absorption obtained where the sample was first subjected to a 10 minute plasma treatment stage without water vapor, and then to plasma treatment with water vapor present in the concentration indicated. It is clear that pretreatment in the absence of water vapor is of great importance. The capillary absorption of all samples not subject to the 1st stage pretreatment was actually less than that of the untreated sample, except at relatively long treatment times. In other words, the plasma treatment had improved the hydrophobic properties of the sample, which became more water repellent. It is believed that these results can be explained as follows. Under near vacuum conditions in the treatment chamber, partial evaporation of the fabric impregnating material occurs. These extraneous vapors contaminate the plasma and have a negative influence on the desired results of the plasma treatment. This may lead to the increase of the water-repellent properties of fabrics which, for example, makes subsequent coloring or dyeing of the fabric more difficult. It is believed that pretreatment by an electrical discharge in the evacuated chamber without supplying gas to the chamber helps to eliminate and to decompose the vapors of the impregnating substance. During the subsequent plasma treatment stage, in the presence of $H_2O$ vapor, the extraneous vapors will no longer interfere with the treatment, yielding the considerably increased capillary absorption figures shown in column 6 of Table 9.

Table 10 shows resulting capillary absorption as a function of specific power input and treatment time in relation to an untreated sample and reference analogue treatment without $H_2O$ vapor.

Table 11 shows the results obtained for flax based fabrics, of the type which are impregnated for use as industrial belting The Table gives separate results for a) non-impregnated fabrics, b) for fabrics pre-impregnated with viscose and c) for fabrics pre-impregnated with resin. The samples were treated at constant specific power and treatment time with varying concentrations of $H_2O$ vapor. The criterion used for comparing effectiveness of the treatment is the time required for absorption of liquid (viscose and water) to a height of 25 mm in a treated sample suspended over the liquid. The results show that, also for these materials, the presence of water vapor in the inorganic gas plasma enhances the surface property modification process in comparison to the analogue samples treated without water vapor.

EXAMPLES

Example 1

A 150=150 mm sample of wool fabric with specific density 820 g/m2 was placed into a plasma discharge chamber equipped with external cylindrical electrodes. Air was extracted by a vacuum pump to a pressure of 0.005 Torr. Oxygen gas with water vapor added to a concentration of 0.1% was then introduced into the chamber to a pressure 0.5 Torr. A glow discharge was ignited by supplying high frequency voltage (at 6.25 Mhz) to the electrodes for 120 sec with specific power input of 0.35 wt/cm3. The discharge was then extinguished and vacuum pumping stopped. Air was admitted into the system and the sample removed from the discharge chamber. The sample subjected to testing after treatment showed substantially unimpaired mechanical properties. Air penetration of the untreated sample was measured as 24.9 cm3/cm2.sec. Air penetration of the sample following the plasma treatment was 26.1 cm3/cm2.sec. Wear testing of the initial sample was measured at 1,200 revolutions. Wear testing of the treated sample was measured at 1,500 revolutions. Capillary absorption of untreated sample was 11 mm/10 min. Capillary absorption of treated sample was found to be 24 mm/10 min. Capillary absorption of a similar sample treated without water vapor ($[H_2O]=0.0$) in the plasma was 19 mm/10 min.

Example 2

A 150×150 mm sample of wool fabric with specific density 830 g/m2 was placed into a gas discharge chamber between parallel plate electrodes placed longitudinally and diametrically opposite to each other on the exterior of the tubular plasma treatment chamber, and treated for 15 seconds under conditions indicated in example 1, but with the specific power of the electrical discharge adjusted to 2 wt/cm3. Mechanical strength and deformation properties and air penetration characteristics of the sample were not significantly affected by the treatment. Wear testing of the untreated sample was measured at 850 revolutions. Wear testing of the sample treated in the presence of water vapor was 1,130 revolutions. Capillary absorption of the untreated sample was 0.7 mm/10 min. Capillary absorption of a sample treated without water vapor ($[H_2O]=0.0$) was 13 mm/10 min. Capillary absorption of the sample treated with water vapor present in the chamber at the concentration indicated in Example 1 was 18 mm/10 min.

Example 3

A 200×400 mm sample of paper with a thickness of 142 μm was placed in a discharge unit with parallel plate electrodes and treated under conditions indicated in example 2, but the concentration of water vapor was adjusted to 0.2% and treatment time was 60 sec. Subsequent examination revealed no detrimental effect to the mechanical strength and deformation characteristics of the sample. Capillary absorption of the untreated sample was 12 mm/10 min. Capillary absorption of a sample treated without water vapor ($[H_2O]=0.0$) was 69 mm/10 min. Capillary absorption of the treated sample with water vapor present ($[H_2O]=0.2\%$) was 107 mm/10 min.

Example 4

A 50×50 mm sample of polyethylene film was placed into a glow discharge unit with external cylindrical electrodes, and treated under conditions indicated in example 3 for 5 minutes. The wetting angle of the untreated sample was 90 degrees. The wetting angle of a sample treated without water vapor ($[H_2O]=0.0$) was 44 degrees. The wetting angle of the sample treated in the presence of water vapor was 17 degrees.

Example 5

A sample of flax based fabric was placed into a glow discharge unit with external cylindrical electrodes, and treated under the conditions of example 3 for 5 minutes. The untreated sample showed a time of 5.3 sec for lifting water to a height of 25 mm by capillary absorption; time for lifting viscose to the same height was 46.3 sec. A sample treated without water vapor ($[H_2O]=0.0$) showed a water lifting time of 3.1 sec, and a viscose lifting time of 31.3 sec. The water lifting time for a sample treated with $H_2O$ vapor present was 0.7 sec, and the viscose lifting time for the same sample was 22.3 sec.

By comparison, a similar sample treated in a corona discharge, in accordance with prior art practice, showed a time of 4.4 sec for lifting water to 25 mm, and 32.4 sec for lifting viscose to the same height.

Example 6

A sample of flax based fabric as in Example 5 but preimpregnated with viscose was placed in a glow discharge chamber with external electrodes, and treated under the conditions of example 3 for 160 sec. The untreated sample showed a water lifting time to 25 mm of 12.2 sec, and a viscose lifting time to the same height of 37.4 sec. A similar sample treated without water vapor ($[H_2O]=0.0$) showed a water lifting time of 5.4 sec and a viscose lifting time of 4.5 sec. A similar sample treated with water vapor present in the chamber showed a water lifting time of 4.2 sec and a viscose lifting time of 19.8 sec.

By comparison, a similar sample treated in a corona discharge in accordance with prior art practice showed a lifting time of 7.6 sec for water and 31.7 sec for viscose.

Example 7

A $150 \times 150$ mm sample of cotton fabric preimpregnated with an anti-wrinkling agent was placed in a glow discharge chamber with external cylindrical electrodes. Air was evacuated from the chamber to a pressure of 0.05 Torr. In a 1st treatment stage a glow discharge was ignited by supplying high frequency voltage ($f=6.25$ Mhz) to the electrodes, without introducing gases into the chamber. Specific power of the discharge was 0.35 wt/cm3 and time of treatment was 30 sec during this first stage.

This was followed by a second treatment stage where oxygen gas with water vapor added ($[H_2O]=0.15\%$) was introduced into the chamber to a pressure of 1.5 Torr. The glow discharge was reignited for 120 seconds with a specific power of 0.35 wt/cm3 during this second stage. The discharge was then extinguished and vacuum pumping was stopped. Air was admitted into the system and the sample removed from the discharge chamber. The capillary absorption of the untreated sample was 12 mm/10 min. After the two stage treatment capillary absorption of the treated sample increased to 21 mm/10 min. Capillary absorption of a sample subjected only to the second stage treatment, without 1st stage treatment, was found to be 14 mm/min.

TABLE 1

EFFECT OF WATER VAPOR CONCENTRATION ON WETTING ANGLE
(FOR LOW PRESSURE POLYETHYLENE)

| ($H_2O$), % | Specific Power Wsp, Wt/cm3 | Time of Treatment t, min | Wetting angle Q-degrees |
|---|---|---|---|
| initial 0 | 0 | 0 | 90 |
| analogue 0 | 3 | 5 | 43 |
| 0.05 | 3 | 5 | 42.5 |
| 0.075 | 3 | 5 | 37 |
| 0.10 | 3 | 5 | 32 |
| 0.15 | 3 | 5 | 32 |
| 0.2 | 3 | 5 | 35 |
| 0.25 | 3 | 5 | 37 |
| 0.3 | 3 | 5 | 39 |
| 0.4 | 3 | 5 | 40 |
| 0.5 | 3 | 5 | 42 |
| 0.6 | 3 | 5 | 44 |

TABLE 2

EFFECT OF WATER VAPOR ON TREATMENT TIME
FOR OBTAINING WETTING ANGLE
Q = 43 DEGREES
(FOR LOW PRESSURE POLYETHYLENE)

| ($H_2O$), % | Specific Power W sp, Wt/cm3 | Wetting Angle Q-Degrees | Time of Treatment t, sec. |
|---|---|---|---|
| Analogue 0 | 3 | 43 | 300 |
| 0.05 | 3 | 43 | 297 |
| 0.075 | 3 | 43 | 258 |
| 0.1 | 3 | 43 | 223 |
| 0.15 | 3 | 43 | 223 |
| 0.2 | 3 | 43 | 244 |
| 0.25 | 3 | 43 | 258 |
| 0.3 | 3 | 43 | 272 |
| 0.4 | 3 | 43 | 279 |
| 0.5 | 3 | 43 | 293 |
| 0.6 | 3 | 43 | 314 |

TABLE 3

EFFECT OF WATER VAPOR ON SPECIFIC POWER
FOR OBTAINING WETTING ANGLE
Q = 43 DEGREES
(FOR LOW PRESSURE POLYETHYLENE)

| ($H_2O$), % | Time of Treatment, t, min | Wetting Angle Q-Degrees | Specific Power W sp, Wt/cm3 |
|---|---|---|---|
| Analogue 0 | 5 | 43 | 3 |
| 0.05 | 5 | 43 | 2.93 |
| 0.075 | 5 | 43 | 2.63 |
| 0.1 | 5 | 43 | 2.34 |
| 0.15 | 5 | 43 | 2.35 |
| 0.2 | 5 | 43 | 2.51 |
| 0.25 | 5 | 43 | 2.63 |
| 0.3 | 5 | 43 | 2.75 |
| 0.4 | 5 | 43 | 2.81 |
| 0.5 | 5 | 43 | 2.98 |
| 0.6 | 5 | 43 | 3.22 |

TABLE 4

EFFECT OF SPECIFIC POWER ON WETTING ANGLE
AT BOTH MOST EFFICIENT CONCENTRATION OF
WATER VAPOR AND AT FIXED TIME OF TREATMENT
(FOR LOW PRESSURE POLYETHYLENE)

| Time of Treatment t, min | Specific Power W sp, Wt/cm3 | ($H_2O$) = 0.0 | ($H_2O$), % | Q ($H_2O$) |
|---|---|---|---|---|
| 0 initial | 0 | 90 | 0 | 90 |
| 5 | 0.5 | 65 | 0.1 | 43.5 |
| 5 | 1.0 | 52 | 0.1 | 25 |
| 5 | 1.5 | 48 | 0.1 | 17 |
| 5 | 2.0 | 44 | 0.1 | 18 |
| 5 | 2.5 | 43.5 | 0.1 | 22 |
| 5 | 3.0 | 43.0 | 0.1 | 32 |
| 5 | 3.5 | 43.0 | 0.1 | 56 |

TABLE 5

EFFECT OF TREATMENT TIME ON ANGLE
OF WETNESS AT MOST EFFICIENT CONCENTRATION
OF WATER VAPOR AND FIXED SPECIFIC POWER
(FOR LOW PRESSURE POLYETHYLENE)

| Wsp, Wt/cm3 | t, min. | Q, ($H_2O$) = 0.0 | ($H_2O$), % | Q ($H_2O$) |
|---|---|---|---|---|
| 0 initial | 0 | 90 | 0 | 90 |
| 3 | 1 | 72 | 0.1 | 43 |
| 3 | 2 | 60 | 0.1 | 24 |
| 3 | 3 | 52 | 0.1 | 17 |
| 3 | 4 | 47 | 0.1 | 23 |
| 3 | 5 | 43 | 0.1 | 32 |
| 3 | 6 | 43 | 0.1 | 46 |

TABLE 6

FOR POLYPROPYLENE

| ($H_2O$), % | Specific Power W sp Wt/cm3 | Time of Treatment t, min | Wetting Angle Q-Degrees |
|---|---|---|---|
| Initial 0 | 0 | 0 | 90 |
| Analogue 0 | 3 | 5 | 55 |
| 0.05 | 3 | 5 | 53.5 |
| 0.075 | 3 | 5 | 48 |
| 0.1 | 3 | 5 | 45 |
| 0.15 | 3 | 5 | 43 |
| 0.2 | 3 | 5 | 44 |
| 0.25 | 3 | 5 | 46 |
| 0.3 | 3 | 5 | 52 |
| 0.4 | 3 | 5 | 53 |
| 0.5 | 3 | 5 | 54 |
| 0.6 | 3 | 5 | 57 |
| | | | ($H_2O$) = 0.0 |
| 0.1 | 0.5 | 5 | 72 | 78 |
| 0.1 | 1.0 | 5 | 56 | 69 |
| 0.1 | 1.5 | 5 | 44 | 63 |
| 0.1 | 2.0 | 5 | 39 | 58 |
| 0.1 | 2.5 | 5 | 40 | 57 |
| 0.1 | 3 | 5 | 45 | 55 |
| 0.1 | 3 | 5 | 55 | 55 |

TABLE 7

EFFECT OF WATER VAPOR CONCENTRATION ON CAPILLARY ABSORPTION UNDER FIXED TREATMENT CONDITIONS (FOR NON-IMPREGNATED FABRICS)

| 1st Stage | Specific Power Wt/cm3 | Time of Treatment Sec. | ($H_2O$), % | Capillary Absorption mm/10 min. |
|---|---|---|---|---|
| Initial | 0 | 0 | 0 | 21 |
| Analogue | 3.0 | 600 | 0 | 28 |
| + | 3.0 | 600 | 0.05 | 34 |
| + | 3.0 | 600 | 0.1 | 41 |
| + | 3.0 | 600 | 0.15 | 49 |
| + | 3.0 | 600 | 0.20 | 54 |
| + | 3.0 | 600 | 0.25 | 54 |
| + | 3.0 | 600 | 0.30 | 49 |
| + | 3.0 | 600 | 0.40 | 46 |
| + | 3.0 | 600 | 0.50 | 41 |
| + | 3.0 | 600 | 0.60 | 28 |

TABLE 8

EFFECT OF TREATMENT TIME ON CAPILLARY ABSORPTION AT MOST EFFICIENT CONCENTRATION OF WATER VAPOR AND FIXED SPECIFIC POWER (FOR NON-IMPREGNATED FABRICS)

| Specific Power Wt/cm3 | Time of Treatment, Sec. | Capillary Absorption at ($H_2O$) = 0.0 mm/10 min. | ($H_2O$), % | Capillary Absorption mm/10 min. |
|---|---|---|---|---|
| 0 | 0 | 21 | 0 | 21 |
| 3.0 | 60 | 24 | 0.2 | 30 |
| 3.0 | 120 | 26 | 0.2 | 38 |
| 3.0 | 180 | 28 | 0.2 | 44 |
| 3.0 | 240 | 28.5 | 0.2 | 48 |
| 3.0 | 300 | 28.5 | 0.2 | 50.5 |
| 3.0 | 360 | 29 | 0.2 | 52 |
| 3.0 | 420 | 29 | 0.2 | 52.5 |
| 3.0 | 480 | 29 | 0.2 | 53 |
| 3.0 | 540 | 39.5 | 0.2 | 53.5 |
| 3.0 | 600 | 29.5 | 0.2 | 54 |

TABLE 9

EFFECT OF TREATMENT TIME ON CAPILLARY ABSORPTION AT MOST EFFICIENT CONCENTRATION OF WATER VAPOR AND FIXED SPECIFIC POWER (FOR IMPREGNATED FABRICS)

| Specific Power Wt/cm3 | Time of Treatment t, Sec. | Capillary Absorption mm/10 min without Ist stage at ($H_2O$) = 0.0 | Capillary Absorption mm/10 min with Ist stage at ($H_2O$) = 0.0 | ($H_2O$), % | Capillary Absorption mm/10 min |
|---|---|---|---|---|---|
| 3.0 | 0 | 12 | 12 | 0 | 12 |
| 3.0 | 60 | 6.5 | 8.2 | 0.2 | 17 |
| 3.0 | 120 | 3.0 | 6.0 | 0.2 | 21 |
| 3.0 | 180 | 0.5 | 3.5 | 0.2 | 21 |
| 3.0 | 240 | 1.0 | 4.5 | 0.2 | 24 |
| 3.0 | 300 | 3.0 | 6.0 | 0.2 | 26 |
| 3.0 | 360 | 4.0 | 8.5 | 0.2 | 29 |
| 3.0 | 420 | 6.0 | 12.0 | 0.2 | 31 |
| 3.0 | 480 | 8.0 | 16.0 | 0.2 | 31.5 |
| 3.0 | 540 | 10.0 | 18.0 | 0.2 | 32 |
| 3.0 | 600 | 12.0 | 20.0 | 0.2 | 33 |

TABLE 10

EFFECT OF SPECIFIC POWER OR TREATMENT TIME ON CAPILLARY ABSORPTION AT FIXED CONCENTRATION OF WATER VAPOR (FOR NON-IMPREGNATED FABRICS)

| Specific Power Wt, Wt/cm3 | Time of Treatment | ($H_2O$), % | Capillary Absorption mm/10 min. |
|---|---|---|---|
| 0.003 | 600 | 0.3 | 30.5 |
| 3.0 | 600 | 0.3 | 49 |
| 0.002 | 600 | 0.3 | 21 |
| 3.1 | 600 | 0.3 | 54 change of properties |
| 1.5 | 3 | 0.3 | 31 |
| 1.5 | 600 | 0.3 | 49 |
| 1.5 | 2 | 0.3 | 21.5 |
| 1.5 | 610 | 0.3 | 52 change of properties |
| 0 | 0 | 0 | 21 initial |
| 3.0 | 600 | 0 | 28 analogue |
| 1.5 | 600 | 0 | 25 analogue |

TABLE 11

EFFECT OF WATER VAPOR CONCENTRATION ON FLUID LIFTING TIME THROUGH 25 MM (FOR FLAX BASED FABRICS)

| Impregnation | Specific power, W Wt/cm3 | Time of Treatment t, Sec. | ($H_2O$), % | Time of through visc. | lifting 25 mm water |
|---|---|---|---|---|---|
| Without | 0 | 0 | 0 initial | 46.3 | 5.3 |

TABLE 11-continued
EFFECT OF WATER VAPOR CONCENTRATION ON
FLUID LIFTING TIME THROUGH 25 MM
(FOR FLAX BASED FABRICS)

| Impregnation | Specific power, W Wt/cm3 | Time of Treatment t, Sec. | (H2O), % | Time of through visc. | lifting 25 mm water |
|---|---|---|---|---|---|
| 1st stage | 3.0 | 600 | 0 analog | 39.7 | 4.4 |
| | 3.0 | 600 | 0.05 | 32.4 | 4.0 |
| | 3.0 | 600 | 0.1 | 27.3 | 1.5 |
| | 3.0 | 600 | 0.15 | 22.5 | 0.5 |
| | 3.0 | 600 | 0.2 | 21.1 | <0.5 |
| | 3.0 | 600 | 0.3 | 25.4 | <0.5 |
| | 3.0 | 600 | 0.4 | 30.1 | 1.1 |
| | 3.0 | 600 | 0.5 | 37.8 | 2.5 |
| | 3.0 | 600 | 0.6 | 42.3 | 4.5 |
| Prelim. Viscose Impregnation | 0 | 0 | 0 initial | 37.4 | 12.2 |
| | 3.0 | 600 | 0 analog | 31.7 | 7.6 |
| | 3.0 | 600 | 0.05 | 30.1 | 7.2 |
| | 3.0 | 600 | 0.1 | 22.5 | 5.7 |
| | 3.0 | 600 | 0.2 | 18.5 | 4.2 |
| | 3.0 | 600 | 0.3 | 21.2 | 3.8 |
| | 3.0 | 600 | 0.4 | 23.1 | 5.4 |
| | 3.0 | 600 | 0.5 | 24.5 | 5.2 |
| | 3.0 | 600 | 0.6 | 31.8 | 7.8 |
| Prelim. Resin Impregnation | 0 | 0 | 0 initial | 49.1 | 25.3 |
| | 3.0 | 600 | 0 analog | 31.6 | 13.5 |
| | 3.0 | 600 | 0.05 | 30.4 | 12.4 |
| | 3.0 | 600 | 0.1 | 23.1 | 10.3 |
| | 3.0 | 600 | 0.2 | 19.1 | 8.3 |
| | 3.0 | 600 | 0.3 | 22.7 | 7.9 |
| | 3.0 | 600 | 0.4 | 23.4 | 9.1 |
| | 3.0 | 600 | 0.5 | 25.3 | 11.2 |
| | 3.0 | 600 | 0.6 | 32.3 | 14.1 |

What is claimed is:

1. A method of improving the hydrophilic surface properties of polymer films, fabrics of natural and synthetic fibers, flax based fabrics, or cellulose fiber materials comprising: treating said polymer films, fabrics of natural and synthetic fibers, flax based fabrics, or cellulose fiber materials in a low temperature gas plasma comprising an organic gas admixed with water vapor, said water vapor being present at a concentration of between 0.05% and 0.55.

2. The method of claim 1 comprising treating said polymer films, fabrics of natural and synthetic fibers, flax based fabrics, or cellulose fiber materials for a time ranging from 3 to 600 seconds.

3. The method of claim 1 comprising generating said low temperature plasma between electrodes connected to an electrical power source of alternating frequency between 1 MHz and 40 MHz.

4. The method of claim 3 comprising delivering a specific power of 0.003–3.0 Wt/cm3 to said electrodes.

5. The method of claim 1 wherein said inorganic gas is selected from the group consisting of $O_2$, Ar, $N_2$, NO, air, and mixtures thereof.

6. The method of claim 1 wherein said fabrics are impregnated fabrics, said method further comprising the step of first treating said impregnated fabrics in a plasma generator chamber at a pressure of between 0.05 and 0.1 Torr without supplying gas to said chamber.

7. The method of claim 6 wherein said first treating is characterized by specific power of 0.003 to 3.0 Wt/cm3 for 1 to 60 seconds.

8. The method of claim 7 wherein said first treating comprises generating a plasma with an alternating frequency power source of between 1 to 40 MegaHertz.

9. A method for conditioning the surface activity of polymer films, fabrics of natural and synthetic fibers, flax based fabrics, or cellulose fiber materials, for improved binding with dyestuffs and faster viscose impregnation of said fiber materials and reduced wetting angle of polymer films, comprising the steps of:

placing the polymer films, fabrics of natural and synthetic fibers, flax based fabrics, or cellulose fiber materials in a plasma generator chamber; and exposing the polymer films, fabrics of natural and synthetic fibers, flax based fabrics, or cellulose fiber materials to a low temperature gas plasma in said chamber at a pressure of 0.01–10 Torr, for a treatment time ranging from 3 seconds to 600 seconds, characterized in that said gas plasma comprises an inorganic gas admixed with water vapor, said water vapor being present in a concentration of between 0.05% and 0.5%.

10. The method of claim 1 further comprising generating said gas plasma between electrodes connected to an electrical power source providing specific power input of 0.003 to 3.0 Wt/cm3 and a frequency of between 1 and 40 MegaHertz.

11. A method of improving the hydrophilic surface properties of polymer films, fabrics of natural and synthetic fibers, flax based fabrics, or cellulose fiber materials by treatment in a low temperature plasma, comprising the steps of placing the polymer films, fabrics of natural and synthetic fibers, flax based fabrics, or cellulose fiber materials in a plasma generator chamber; and exposing the polymer films, fabrics of natural and synthetic fibers, flax based fabrics, or cellulose fiber materials to a low temperature gas plasma in said chamber for a treatment time ranging from 3 seconds to 600 seconds, characterized in that said gas plasma comprises an inorganic gas admixed with water vapor, said water vapor being present in a concentration of between 0.05% and 0.5%.

12. The method of claim 11 wherein said fabrics are impregnated fabrics, said method further comprising the step of first treating said impregnated fabrics in a plasma generator chamber at a pressure of between 0.05 and 0.1 Torr without supplying gas to said chamber.

13. The method of claim 1 wherein said cellulose fiber material is paper.

14. The method of claim 9 wherein said cellulose fiber material is paper.

15. The method of claim 11 wherein said cellulose fiber material is paper.

* * * * *